United States Patent [19]
Galletti

[11] Patent Number: 5,284,303
[45] Date of Patent: Feb. 8, 1994

[54] EQUIPMENT FOR DEOILING SWARF RESULTING FROM MACHINING OPERATIONS

[75] Inventor: Alfonso Galletti, Turin, Italy

[73] Assignee: GI. PI. S.R.l., Turin, Italy

[21] Appl. No.: 916,200

[22] Filed: Jul. 17, 1992

[30] Foreign Application Priority Data

Aug. 8, 1991 [IT] Italy ............... T091A000641

[51] Int. Cl.$^5$ ............................................. B02C 23/14
[52] U.S. Cl. ........................................ 241/24; 241/77;
241/79; 241/81; 241/101.2; 209/17
[58] Field of Search ............... 241/81, 77, 79, 101.2, 241/24, 37.5, 186.35; 209/241, 250, 273, 352, 17

[56] References Cited

U.S. PATENT DOCUMENTS

| | | | |
|---|---|---|---|
| 2,004,753 | 6/1935 | Gredell | 241/186.35 X |
| 2,453,008 | 11/1948 | Fowler | 241/186.35 X |
| 2,852,418 | 9/1958 | MacDonald | 134/65 X |
| 3,547,359 | 12/1970 | Wenger | 241/186.35 X |
| 3,754,559 | 8/1973 | Seiwert | 134/65 |
| 3,998,396 | 12/1976 | Umphrey et al. | 241/81 |
| 4,045,086 | 8/1977 | Parkes et al. | 241/186.35 X |
| 4,073,301 | 2/1978 | Mackinnon | 134/65 |
| 4,097,306 | 6/1978 | Carman | 134/10 |
| 4,140,282 | 2/1979 | Steimel | 241/248 X |
| 4,274,952 | 6/1981 | Hanke et al. | 209/273 |
| 4,406,796 | 9/1983 | Duval | 134/10 X |
| 4,997,566 | 3/1991 | Davis | 209/273 X |
| 5,133,808 | 7/1992 | Sorrentino et al. | 134/10 |

FOREIGN PATENT DOCUMENTS

| | | | |
|---|---|---|---|
| 1296369 | 3/1987 | U.S.S.R. | 241/37.5 |
| 1344583 | 10/1987 | U.S.S.R. | 241/24 |
| 1266694 | 3/1972 | United Kingdom | 241/24 |

*Primary Examiner*—Mark Rosenbaum
*Assistant Examiner*—Frances Chin
*Attorney, Agent, or Firm*—Edward D. Manzo; David Lucente

[57] ABSTRACT

Equipment for deoiling swarf resulting from machining operations including a deoiling centrifuge and an endless conveyor for supplying the swarf to the centrifuge. The conveyor has a support and sliding surface for the swarf with a grating through which the swarf falls for transfer to the deoiling centrifuge but through which foreign bodies are prevented from passing.

10 Claims, 5 Drawing Sheets

EQUIPMENT FOR DEOILING SWARF RESULTING FROM MACHINING OPERATIONS

FIELD OF THE INVENTION

The present invention relates in general to equipment for deoiling swarf resulting from machining operations during which lubricant-refrigerant liquids are used.

DESCRIPTION OF PRIOR ART

More particularly, the invention relates to equipment of the type including a deoiling centrifuge, an endless conveyor for supplying the swarf to the centrifuge, and pneumatic means for discharging the centrifuged swarf, in which the conveyor includes a pair of motor-driven chains and a series of transverse bars interconnecting the chains, and in which the conveyor has an ascending conveyor pass which is associated with a support and sliding surface for the swarf and has a top region for discharging the swarf by dropping it towards the deoiling centrifuge.

In deoiling equipment of this type, the action of the centrifuge, which has suitable blades for the purpose, is utilised for the pneumatic discharge of the deoiled swarf, thus avoiding the installation of output conveyors and allowing for a wide range of possible layouts both for the centrifuge and as regards the discharge of the deoiled swarf.

During the use of such equipment, the swarf sent to the centrifuge by the endless conveyor often contains chips or, in any case, foreign bodies which are produced in the course of the machining operation and are of considerable size and weight compared with the swarf. These bodies inevitably reach the deoiling centrifuge and, as well as considerably increasing operating noise, constitute a risk of damage to the centrifuge. Moreover, because of the mass of the foreign bodies, the size of the centrifugal expulsion force exerted thereon may also involve serious risks of damage to the pneumatic system for discharging the swarf.

SUMMARY OF THE INVENTION

The object of the invention is to prevent this problem and to provide equipment of the type defined at the beginning, in which bodies other than swarf are effectively denied access to the deoiling centrifuge.

According to the invention, this object is achieved by virtue of the fact that, near the top region of the ascending conveyor pass of the conveyor for supplying the swarf to the centrifuge, the support and sliding surface of the conveyor has a grating through which the swarf can pass towards the deoiling centrifuge.

By virtue of this concept, pieces with dimensions larger than those of the holes defined by the grating are denied access to the deoiling centrifuge so that both the deoiling centrifuge and the pneumatic system for discharging the centrifuged swarf are protected from damage. Such pieces thus continue to the top of the conveyor pass of the conveyor so that they can be discharged from the equipment directly.

For this purpose, means are associated with the top region of the conveyor, downstream of the grating, for collecting the material which has not passed through the grating.

In many applications of the equipment according to the invention, the swarf is elongate and agglomerated which means that it must be broken up before being sent to the deoiling centrifuge by the conveyor. In such applications, the equipment also includes a crusher with superposed contrarotating crushing rollers, disposed upstream of the conveyor and associated with a container having a base constituted by an endless horizontal feeder including a pair of motor-driven chains and a series of transverse bars which interconnect the chains, the feeder having a conveyor pass associated with a support surface on which the swarf can slide towards the crusher and a return pass beneath the conveyor pass for transferring the swarf to the conveyor associated with the deoiling centrifuge. A fairly wide gap is left between the contrarotating rollers of the crusher, the conformation of which is known, and the conveyor pass of the feeder so that any large foreign bodies in the swarf pass through the gap directly onto the return pass of the feeder, avoiding the crusher.

According to a further characteristic of the invention, the support and sliding surface of the feeder also has a grating, upstream of the contrarotating crushing rollers, so that the small swarf can pass directly onto the return pass of the feeder.

This prevents the swarf which is already of a size suitable for sending to the centrifuge from being passed through the crushing rollers unnecessarily, thus ensuring better continuity of transportation to the deoiling centrifuge and hence, in short, enabling the machine to operate at a more uniform rate.

According to a particularly advantageous aspect of the invention, both of the grating, that is, the grating associated with the conveyor of the deoiling centrifuge and the grating of the feeder of any crusher, are formed by a plurality of parallel transverse plates which are disposed in a hole in the respective support and sliding surface, and are inclined forwardly at an acute angle to the direction of advance of the swarf. This angle of inclination, which may vary from a minimum of 10° to more than 40°, conveniently prevents the material which cannot pass through the grating from becoming stuck or jammed between the transverse plates forming the grating.

BRIEF DESCRIPTION OF THE DRAWINGS

Further characteristics and advantages of the invention will become clear in the course of the detailed description which follows, with reference to the appended drawings, provided purely by way of non-limiting example, in which.

With reference to the drawings, the equipment according to the invention for deoiling swarf resulting from machining operations includes, essentially, a section 1 for crushing the swarf and a centrifugal deoiling section 2. It should be made clear immediately that the crushing section 1 is not strictly necessary and may be omitted in cases where the swarf to be deoiled is already of an acceptable size and does not need to be reduced for centrifuging.

DESCRIPTION OF THE PREFERRED EMBODIMENT

Figure 4:
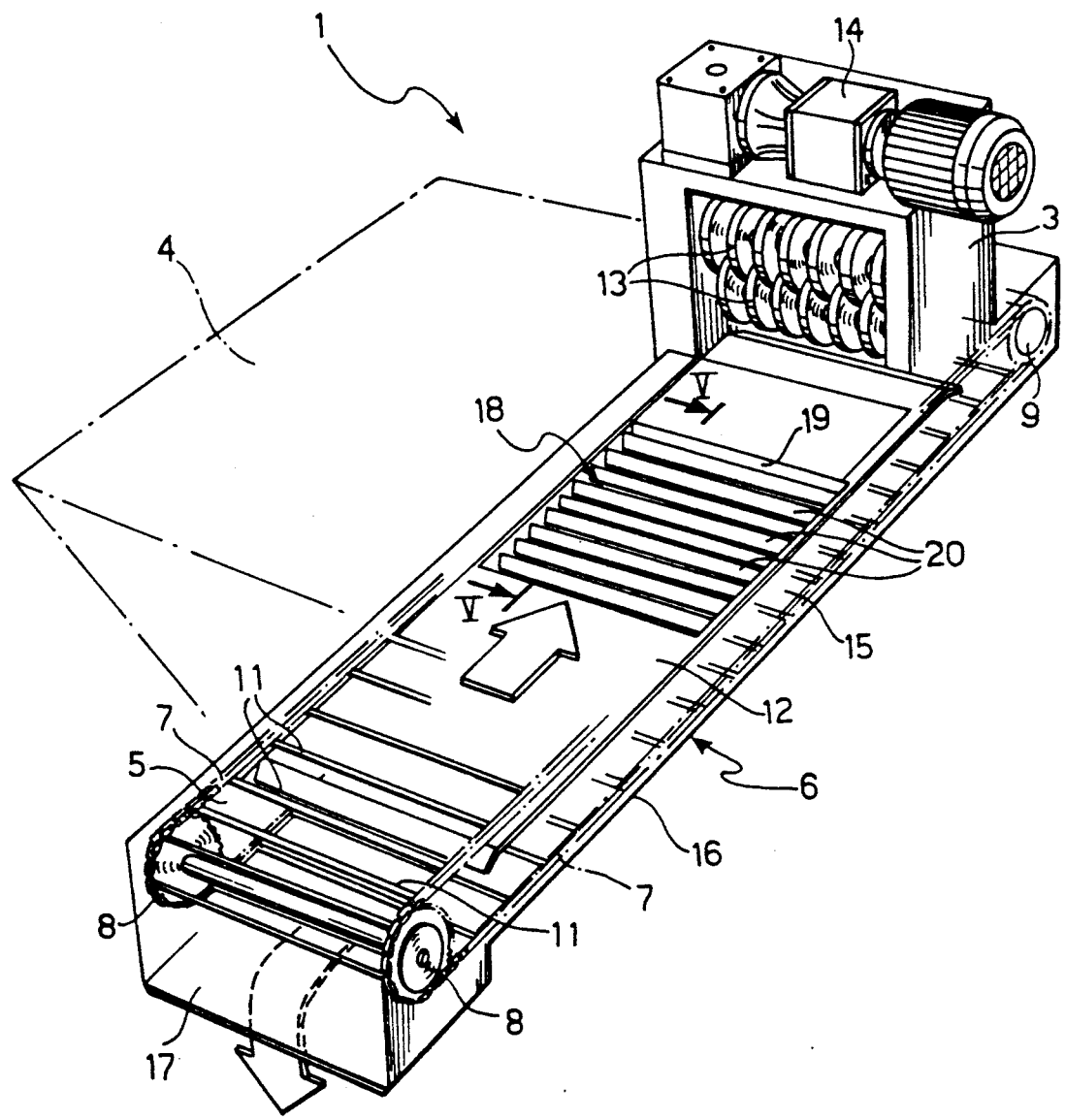
FIG. 4 is a perspective view of a part of the equipment on an enlarged scale.

The crushing unit 1 is constituted, in generally known manner, by a framework 3 on top of which is a hopper 4 whose base is constituted by the conveyor pass 5 of an endless horizontal feeder 6. As can better be seen in FIG. 4, the feeder is constituted by a pair of endless parallel chains 7 which pass around respective pairs of sprockets 8, 9, the latter of which are driven by a motor-reduction unit 10. The chains 7 are interconnected by a plurality of transverse bars 11 which slide along the conveyor pass 5 in contact with a support plate 12 which ends beneath a pair of superposed, contrarotating crushing rollers 13. The rollers 13 are rotated in turn by a reversible motor-reduction unit 14.

The return pass of the feeder 6, indicated 15, is below and parallel to the plate 12, and the bars 11 bear on a lower plate 16 with a discharge portion 17 at its end furthest from the crushing unit 13.

Figure 1:
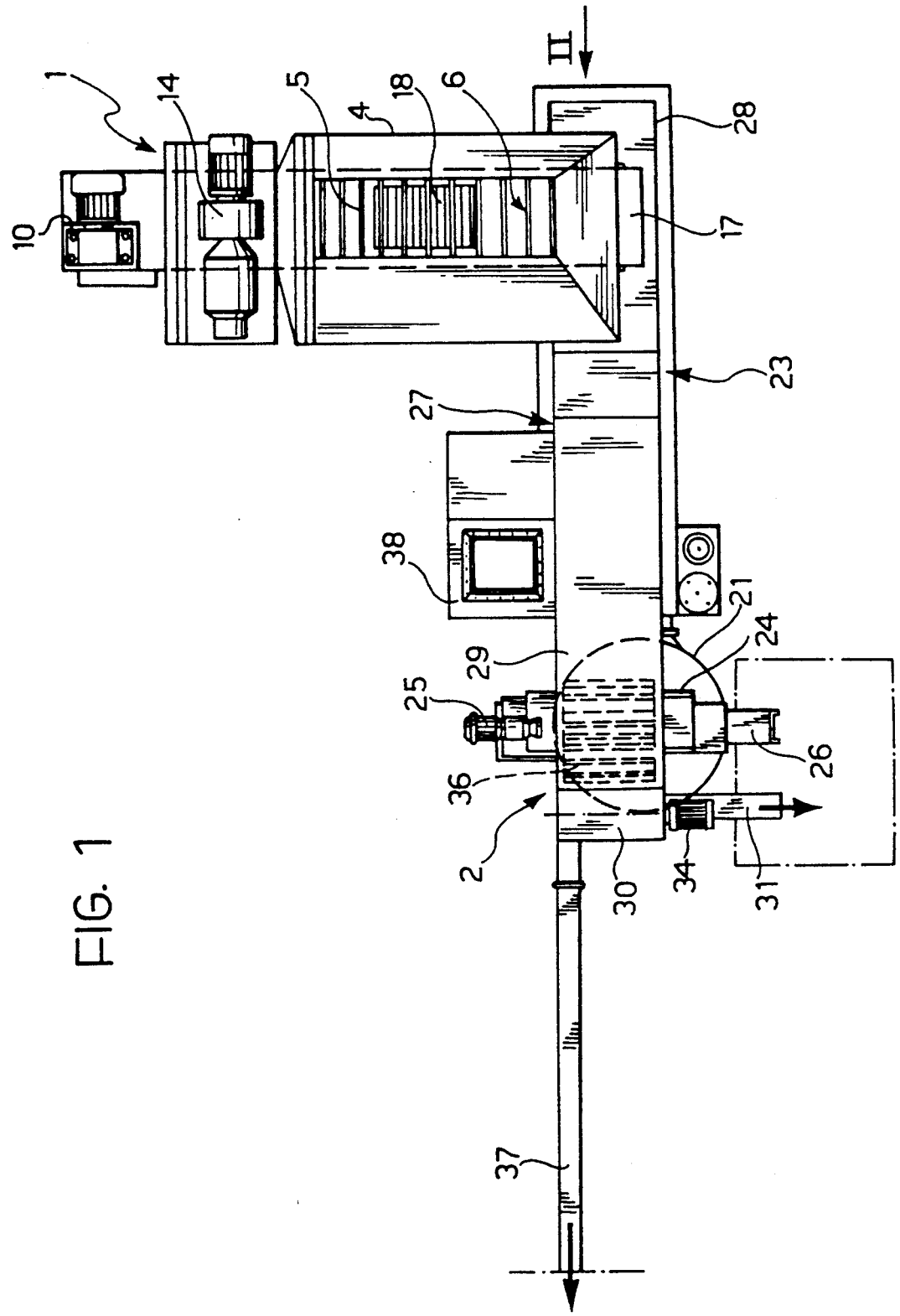
FIG. 1 is a schematic plan view of equipment according to the invention.
Figure 2:
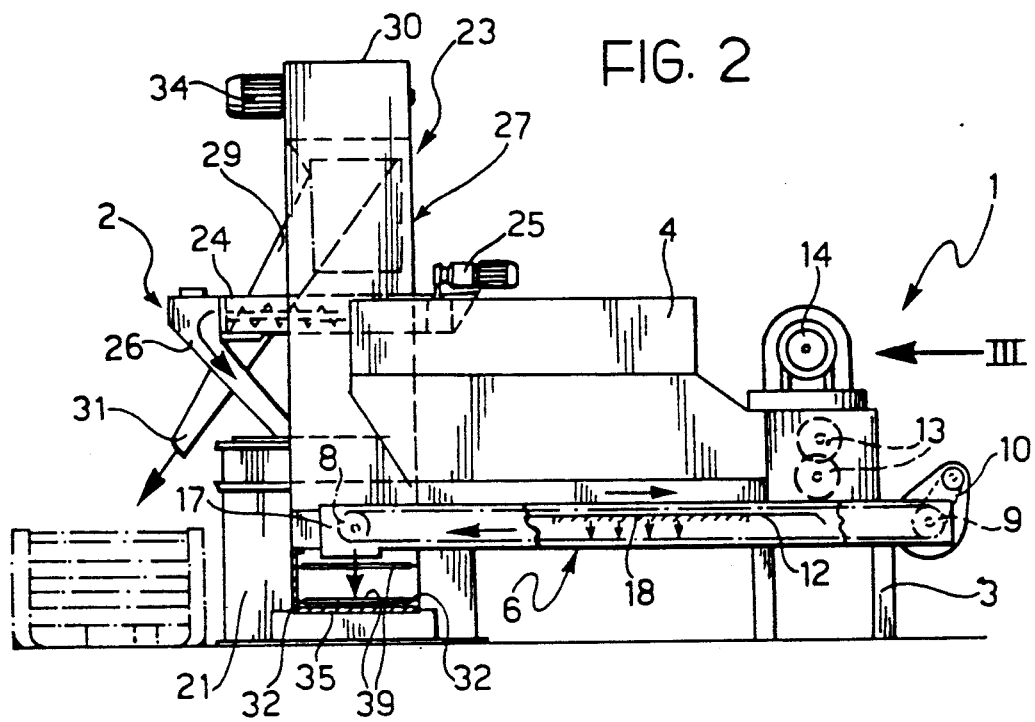
FIG. 2 is a front elevational view taken on the arrow II of FIG. 1.

As can be seen in FIG. 2, a certain clearance is maintained between the end portion of the upper plate 12 and the crushing rollers 13 so that, in use, a certain portion of the material which is not passed through the rollers 13 can pass directly to the return pass 15.

Figure 5:
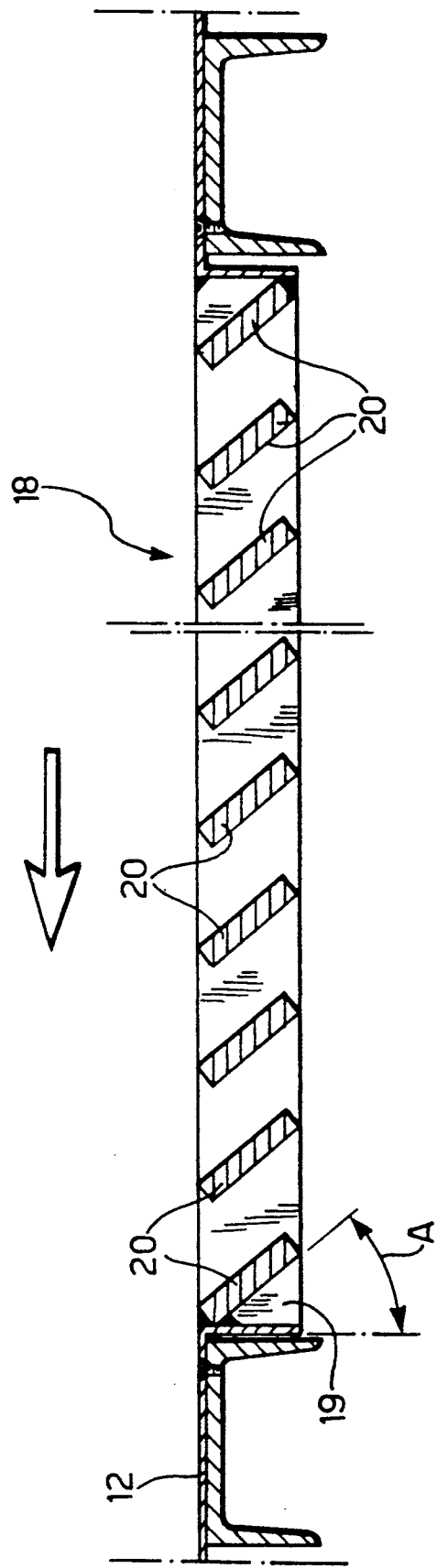
FIG. 5 is a section taken on the line V—V of FIG. 4, on an enlarged scale.

According to the invention, upstream of the crushing rollers 13, the upper plate 12 has a grating 18 constituted by a hole 19 in which a plurality of equally-spaced, parallel, transverse plates 20 is disposed. As shown in greater detail in FIG. 5, the transverse plates 20 are inclined forwardly, that is, towards the crushing rollers 13, at an acute angle to the vertical. This angle, which is indicated A in FIG. 5, may be of between about 10° and 60° and, conveniently, is of the order of 40°.

The deoiling portion 2 includes, also in generally known manner, a closed container 21 in which a centrifuge, not shown, which has a vertical axis and is constituted in conventional manner by a drum with an upwardly-divergent conical wall with internal guide blades, is rotated by means of a motor-reduction unit 22. The drum is supplied from above by a conveyor, generally indicated 23, a horizontal screw feeder 24 driven by a motor-reduction unit 25, and an inlet pipe 26.

Figure 3:
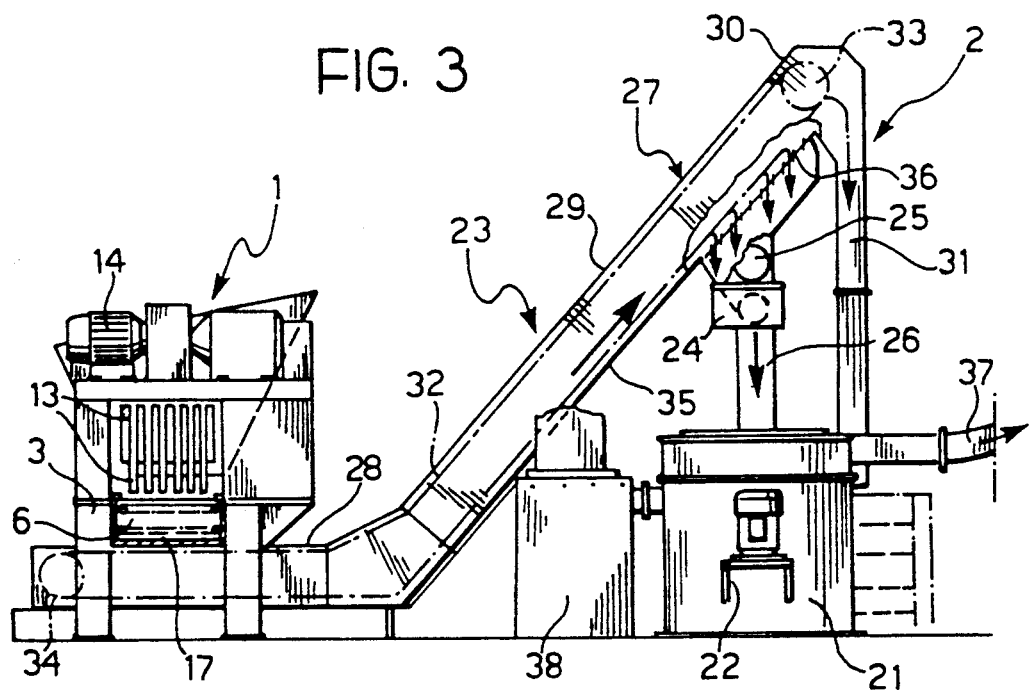
FIG. 3 is a side elevational view taken on the arrow III of FIG. 2.

The conveyor 23 is the same as the feeder 6 described above except that it includes a hollow housing structure 27 with an initial horizontal portion 28 arranged transversely below the discharge portion 17 of the feeder 6, an ascending ramp 29, the top 30 of which is substantially in vertical alignment with the container 21 of the deoiling centrifuge, and a final downward discharge duct 31. Two endless chains 32 are movable within the structure 27 and follow its shape, passing around respective return sprockets, of which only the end ones are shown and are indicated schematically 33 and 34 in FIG. 3. The sprockets 33 at the top 30 of the ascending ramp 29 are rotated by a motor-reduction unit 34.

Figure 6:
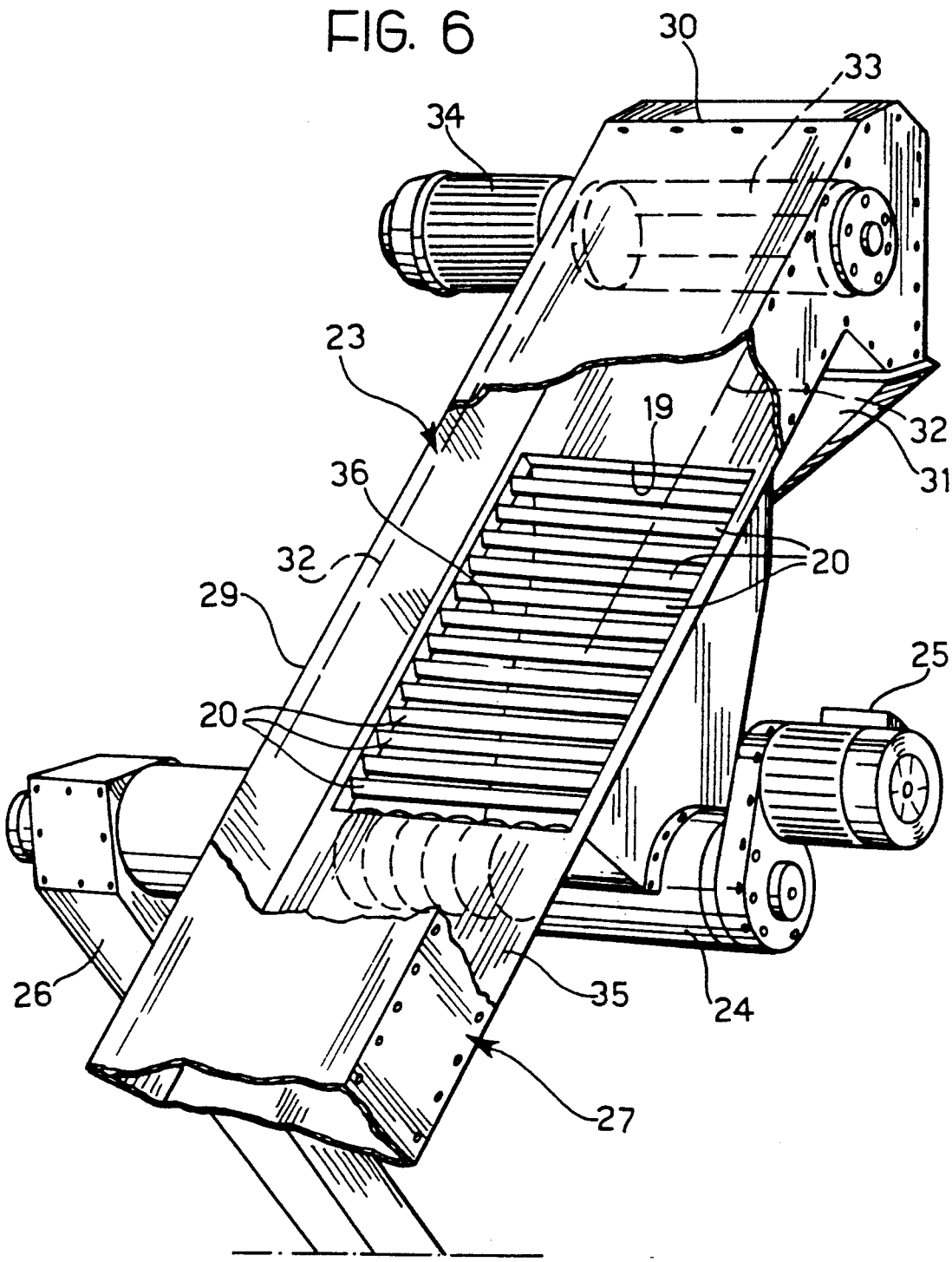
FIG. 6 is a fragmentary perspective view of another portion of the equipment.

The two chains 32 are interconnected by transverse bars 39 (FIG. 2), which are identical to the bars 11 of the feeder 6 and move along the lower pass of the conveyor 23 in contact with the bottom wall of the structure 27, which constitutes a support and sliding surface similar to the plate 12 of the feeder 6. Near the top 30, the lower wall, which is generally indicated 35, has a grating 36 the same as the grating 18 described above with reference to FIGS. 4 and 5. The description with reference to FIG. 5, in particular, thus applies in an identical manner to the grating 36, the same reference numerals being indicated in FIG. 6. The bottom of the grating 36 is in communication with the screw feeder 24, and hence with the deoiling centrifuge housed in the container 21, by means of the pipe 26.

A pneumatic duct 37 for discharging the deoiled swarf and a device 38 for collecting the liquids separated from the swarf are also associated with the container 21.

The equipment according to the invention operates as follows.

The swarf to be deoiled is introduced into the hopper 4 and is then transferred continuously to the crushing rollers 13 by the upper conveyor pass 5 of the feeder 6. During its movement towards the rollers 13, the small swarf, which tends to be disposed at the bottom of the hopper 4, can reach the return pass 15 of the feeder 6 directly through the grating 18 which prevents unnecessary crushing. The larger, possibly agglomerated swarf which cannot pass through the grating 18 is passed through the rollers 13 downstream of which it falls onto the return pass 15 after it has been crushed. Any foreign bodies present in the swarf can also pass directly to the return pass 15 through the gap between the lower roller 13 and the output end of the support and sliding plate 12 without affecting the rollers 13. Should any foreign body nevertheless reach the rollers 13 and possibly jam them, the sense of operation of the motor-reduction unit 14 is reversed, which usually releases the foreign body. If the blockage persists after a certain number of rotations in opposite senses imparted by the motor-reduction unit 14, a suitable safety system (of known type) temporarily stops the crusher and operates an alarm signal to enable manual unblocking.

The crushed swarf and any foreign bodies present therein are then transferred continuously by the return pass 15 to the discharge region 17 of the feeder 6 and thence into the structure 27 of the conveyor 23. The lower conveyor pass of the conveyor 23 transfers the swarf with any foreign bodies from the horizontal portion 28 to the ascending ramp 29, towards the top 30 of the structure 27. The swarf reaching the grating 36 at any particular time passes through it and falls into the screw feeder 24 by means of which it is admitted to the deoiling centrifuge housed in the container 21. Any foreign bodies of dimensions such that they cannot pass through the grating 36 reach the top 30 and are then discharged from the equipment through the pipe 31.

The centrifuged swarf is then discharged from the container 21 pneumatically through the outlet duct 37 and the oil and other liquids separated therefrom are collected by the device 38.

By virtue of the barrier defined by the grating 36 which, as stated, prevents foreign bodies from reaching the screw feeder 24, both the deoiling centrifuge and the pneumatic discharge system are protected from damage. The oblique arrangement of the plates 20 which constitute the grating 36 effectively stops the foreign bodies and facilitates their discharge towards the pipe 31 by the conveyor pass of the conveyor 23.

Naturally, the details of construction and forms of embodiment may be varied widely with respect to those described and illustrated, without thereby departing from the scope of the present invention.

What is claimed is:

1. A method of operating equipment for deoiling swarf resulting from machining operations comprising the steps of:
   conveying the swarf along a conveyor to a separation station having a grating;
   allowing smaller swarf to pass through the grating but conveying larger swarf further along the conveyor;
   then moving the smaller swarf to a deoiling apparatus;
   deoiling the smaller swarf; and
   discharging the deoiled swarf.

2. A method according to claim 1 further comprising the step of moving the larger swarf to a collection apparatus.

3. A method according to claim 1 wherein said separation station includes a plurality of parallel transverse plates which are disposed in a hole in a support and sliding surface of the conveyor and are inclined forwardly at an acute angle to the advance direction of the swarf.

4. A method according to claim 1 further comprising the steps of, prior to said conveying step:
   moving the swarf along another conveyor having another separation station having another grating;
   separating the swarf by allowing some of the swarf to fall through the another grating and moving the remaining swarf away from said another separation station;
   crushing the swarf that has been conveyed from said another separation station;
   bypassing said crushing step for swarf that passes through the another grating; and
   moving both the crushed and bypassed swarf to said conveying step.

5. A method according to claim 4 wherein said another separation station includes a plurality of parallel transverse plates which are disposed in a hole in a support and sliding surface of the conveyor and are inclined forwardly at an acute angle to the advance direction of the swarf.

6. Equipment for deoiling swarf resulting from machining operations, comprising:
   a deoiling centrifuge,
   an endless conveyor for supplying the swarf to the centrifuge,
   pneumatic means for discharging the centrifuged swarf,
   the conveyor having an ascending conveyor pass and including a pair of motor-driven chains, a support and sliding surface for the swarf associated with the ascending pass and a top region for discharging the swarf by dropping the swarf towards the deoiling centrifuge,
   wherein, near the top region, the support and sliding surface of the conveyor has a grating through which the swarf can pass towards the deoiling centrifuge.

7. Equipment according to claim 6, further comprising collection apparatus associated with the top region of the conveyor, downstream of the grating, for collecting the material which has not passed through the grating.

8. Equipment according to claim 6, wherein the grating is formed by a plurality of parallel transverse plates which are disposed in a hole in the support and sliding surface of the conveyor and are inclined forwardly at an acute angle to the direction of advance of the swarf.

9. Equipment according to claim 6, further comprising:
   a crusher with superposed contrarotating crushing rollers disposed upstream of the conveyor, and
   a container associated with the crusher and including a base constituted by an endless horizontal feeder including a pair of motor-driven chains and a series of transverse bars which interconnect the chains,
   the feeder including a conveyor pass, a support and sliding surface which is associated with the conveyor pass and on which the swarf can slide towards the crusher, and a return pass beneath the conveyor pass for transferring the swarf to the conveyor,
   wherein the support and sliding surface of the feeding has a further grating upstream of the crushing rollers so that small swarf can pass directly onto the return pass of the feeder.

10. Equipment according to claim 9, wherein said further grating is formed by a plurality of parallel transverse plates which are disposed in a hole in the support and sliding surface of the feeder and are inclined forwardly at an acute angle to the direction of advance of the swarf.

* * * * *